(12) United States Patent
Dalgewicz et al.

(10) Patent No.: US 6,814,905 B1
(45) Date of Patent: Nov. 9, 2004

(54) CONTINUOUS PROCESS AND APPARATUS FOR MAKING THERMOFORMED ARTICLES

(75) Inventors: Edward J. Dalgewicz, Palm City, FL (US); John Bond, deceased, late of Pittsburgh, PA (US); by J. Charles Buff, legal representative, Jupiter, FL (US)

(73) Assignee: Associated Packaging Enterprises, Inc., Waynesville, NC (US)

( * ) Notice: Subject to any disclaimer, the term of this patent is extended or adjusted under 35 U.S.C. 154(b) by 628 days.

(21) Appl. No.: 09/722,594

(22) Filed: Nov. 28, 2000

Related U.S. Application Data

(63) Continuation-in-part of application No. 09/535,953, filed on Mar. 27, 2000, now Pat. No. 6,394,783, which is a continuation-in-part of application No. 09/453,457, filed on Dec. 2, 1999, now Pat. No. 6,576,309.

(51) Int. Cl.[7] ............................................. B29C 51/02
(52) U.S. Cl. ................ 264/37.32; 264/210.1; 264/210.2; 264/151; 264/553; 264/552; 264/544
(58) Field of Search ......................... 264/210.1, 210.2, 264/210.3, 211.12, 553, 297.6, 552, 544, 151, 37.32

(56) References Cited

U.S. PATENT DOCUMENTS

| | | |
|---|---|---|
| 3,314,110 A | 4/1967 | Missbach |
| 3,340,714 A | 9/1967 | Pohl et al. |
| 3,381,445 A | 5/1968 | Vogt |
| 3,429,854 A | 2/1969 | Seckmauera et al. |
| 3,496,143 A | 2/1970 | Siggel et al. |
| 3,632,252 A | 1/1972 | Amberg et al. |
| 3,676,537 A | 7/1972 | Winstead |

(List continued on next page.)

FOREIGN PATENT DOCUMENTS

| | | |
|---|---|---|
| DE | 1906430 | 8/1970 |
| EP | 0088 625 A1 | 9/1983 |
| EP | 04316842 | 11/1992 |
| EP | 0 747 070 | 12/1996 |

(List continued on next page.)

OTHER PUBLICATIONS

Gravalos, In situ compatibilization of poly(ethylene terephthalate)/poly(enthylene–co–ethyl acrylate) blends; Polymer, 1995, pp. 1393–1399, vol. 36 No. 7.

Abstract, EP 88–625A, "Thermo–forming reinforced polyethylene terephthalate sheet" Sep. 14, 1983.

Japanese Kokai Patent Application No. HEI 1[1989]–247454, PTO 01–1747, Translated by Ralph McElroy, *Polyester Resin Composition*, 12 pages, (Translation date: Mar. 2001).

Japanese Document No. H3–122158, Publication Date: May 24, 1991, Patent Application No. H1–261620, Application date: Oct. 6, 1989, *Polyester Resin Composite*, 25 pages.

*Primary Examiner*—Edmund H. Lee
(74) *Attorney, Agent, or Firm*—Banner & Witcoff, Ltd.

(57) ABSTRACT

A continuous process for making a thermoplastic article comprises extruding a sheet of thermoplastic and contacting the sheet with a mold surface while the sheet is in a substantially non-oriented state. The mold surface is selectively heated and/or cooled during thermoforming to maintain the sheet in a molten or thermoformable state. A stripper plate adjacent to the mold surface is maintained at different temperature for inducing a predetermined degree of crystallinity to the sheet, for increasing web stiffness and improving web alignment, and optionally for assisting in the separation of the articles from the mold. A continuous apparatus for making thermoformed articles has co-extruders for extruding at least two distinct layers, which can have dissimilar properties (e.g., polar and non-polar), and a temperature controlled molding surface. Preferred thermoplastic compositions of the present invention have improved toughness and retained intrinsic viscosity.

19 Claims, 5 Drawing Sheets

U.S. PATENT DOCUMENTS

| | | | |
|---|---|---|---|
| 3,865,302 A | 2/1975 | Kane |
| 3,931,383 A | 1/1976 | Erlewine et al. |
| 3,960,807 A | 6/1976 | McTaggart |
| 4,039,609 A | 8/1977 | Thiel et al. |
| 4,061,706 A | 12/1977 | Duffield et al. |
| 4,127,631 A | 11/1978 | Dempsey et al. |
| 4,234,530 A | 11/1980 | Thiel et al. |
| 4,234,536 A | 11/1980 | Thiel et al. |
| 4,250,129 A | 2/1981 | Winstead |
| 4,284,396 A | 8/1981 | Thissen et al. |
| 4,381,279 A | 4/1983 | Jakobsen et al. |
| 4,388,356 A | 6/1983 | Hrivnak et al. |
| 4,413,964 A | 11/1983 | Winstead |
| 4,420,300 A | 12/1983 | Winstead |
| 4,469,270 A | 9/1984 | Gartland |
| 4,563,320 A | 1/1986 | Morgan |
| 4,582,665 A | 4/1986 | Jabarin |
| 4,722,820 A | 2/1988 | Flecknoe-Brown |
| 4,753,980 A | 6/1988 | Deyrup |
| 4,877,571 A | 10/1989 | Reifenhauser |
| 4,946,918 A | 8/1990 | Akiyama et al. |
| 4,981,631 A * | 1/1991 | Cheung et al. ............... 264/50 |
| 4,983,660 A | 1/1991 | Yoshida et al. |
| 4,994,229 A | 2/1991 | Flecknoe-Brown |
| 5,023,137 A | 6/1991 | Smith et al. |
| 5,109,060 A | 4/1992 | Fischer |
| 5,211,662 A | 5/1993 | Barrett et al. |
| 5,346,733 A | 9/1994 | Dalgewicz, III et al. |
| 5,409,967 A | 4/1995 | Carson et al. |
| 5,418,108 A | 5/1995 | Kmiecik-Lawrynowicz et al. |
| 5,436,296 A | 7/1995 | Swamikannu et al. |
| 5,562,997 A | 10/1996 | Krejci et al. |
| 5,614,145 A | 3/1997 | O'Kane |
| 5,614,228 A | 3/1997 | Demerest |
| 5,633,022 A | 5/1997 | Myers |
| 5,783,229 A | 7/1998 | Manlove |
| 6,020,414 A | 2/2000 | Nelsen et al. |
| 6,033,748 A * | 3/2000 | Dunning et al. ............ 428/36.5 |
| 6,077,904 A | 6/2000 | Dalgewicz, III et al. |
| 6,086,800 A | 7/2000 | Manlove |

FOREIGN PATENT DOCUMENTS

| | | |
|---|---|---|
| EP | 0 838 501 A2 | 4/1998 |
| EP | 1 097794 A1 | 5/2001 |
| GB | 1 232 555 | 5/1971 |
| GB | 2 205 063 A | 11/1988 |
| JP | 54-102372 | 11/1979 |
| WO | WO 91/09723 | 7/1991 |
| WO | WO 93 15146 | 8/1993 |
| WO | WO 99/37707 | 7/1999 |
| WO | WO 00/23520 | 4/2000 |
| WO | WO 01/09245 A1 | 2/2001 |
| WO | WO 01/72500 A1 | 10/2001 |

* cited by examiner

CONTINUOUS PROCESS AND APPARATUS FOR MAKING THERMOFORMED ARTICLES

This application is a continuation-in-part of application Ser. No. 09/535,953, filed Mar. 27, 2000, now U.S. Pat. No. 6,394,783, and a continuation-in-part of application Ser. No. 09/453,457, filed Dec. 2, 1999, now U.S. Pat. No. 6,576,309.

FIELD OF THE INVENTION

The present invention is directed to thermoforming and, more particularly, to a continuous process and apparatus for thermoforming polyesters into articles such as ovenable containers, food packaging trays, and the like.

BACKGROUND OF THE INVENTION

Continuous vacuum-forming devices for making containers from thermoplastic sheets typically utilize a continuous sheet of molten plastic which is extruded and vacuum-formed on a continuous belt or a rotating drum having a plurality of mold cavities. Many of these devices utilize residual heat from the extrusion process, thus avoiding the need to reheat the plastic sheet prior to thermoforming. It generally is considered desirable that heat-set articles such as ovenable containers have relatively uniform thermal crystallinity throughout, the article to provide adequate dimensional stability and impact resistance. For example, Demerest U.S. Pat. No. 5,614,228 describes a continuous rotary thermoforming apparatus in which a sheet of molten polyethylene terephthalate is extruded and vacuum-formed on a rotating drum having a plurality of mold cavities around its circumference. A hot oil circuit and electric heating elements are provided to impart different amounts of heat to different locations of the sheet during thermoforming. According to Demerest, additional heat is applied to portions of the articles that have a greater wall thickness to produce more uniform crystallinity throughout the article. The sheet is required to be tensioned and oriented during article forming to prevent the sheet from warping or otherwise distorting during cooling. Orienting the sheet also is said to result in articles having high impact resistance.

Several drawbacks exist with the type of thermoforming device described by Demerest. For example, a minimum amount of crystallinity, which is stated to be at least about 20%, must be obtained in the article to permit the article to be removed from the mold cavity without significant distortion. Thus, the device is not useful for applications where lower degrees of crystallinity may be desired in an article or a portion thereof. Moreover, the degrees of crystallinity actually obtained by using the Demerest apparatus typically are significantly higher than the stated minimum degree, and cannot be controlled effectively. Another drawback is that forming the sheet under tension results in distortion of the article after molding, which limits the ability of the apparatus to be used for many applications requiring especially high tolerances.

The device described in Demerest also is limited in terms of production speed. Following thermoforming, the articles undergo a series of cooling and drying steps prior to being separated from the mold cavities. The formed sheets are (again) tensioned to prevent distortion during separation from the mold. This type of procedure places severe limitations on production rates, especially for larger sized articles.

Dalgewicz U.S. Pat. No. 6,077,904 discloses a thermoforming process for preparing polyesters that are said to have improved impact properties, low oxygen permeability, and low dimensional shrinkage during heating. According to Dalgewicz '904, impact modifiers are dissolved into molten polyester to form a eutectic alloy. On slow cooling, the eutectic alloy is said to freeze to form a mixture of particles of the impact modifier embedded in a matrix of the polyester. By controlling the solidification of the melt, it is said that the size and distribution of precipitates of impact modifier from the melt can be controlled to permit control of the mechanical properties of the composition.

Dalgewicz '904 suffers from several drawbacks. For one, the thermoformed polyesters are extremely brittle, limiting their usefulness in many applications. The eutectic alloy formed requires the use of polyesters having a high initial intrinsic viscosity (I.V.), and also makes the polyesters more susceptible to thermal gradients upon the slow cooling. In addition, large 3D spheroids are developed in the polyesters, resulting in a high 3D morphology, which is undesirable in many applications. Yet another disadvantage of Dalgewicz '904 is that the required cooling rate is very slow. Slow cooling increases the overall time required for processing, which reduces efficiency and cost effectiveness.

Manlove U.S. Pat. No. 6,086,800 teaches a process and apparatus for continuously thermoforming articles. The apparatus has a plurality of mold facets, each of which has (i) a static upper mold facet section and (ii) a dynamic lower mold facet section to which a mold cavity is attached. The two-part mold facet defines a relatively deep mold, i.e., adapted to form deep-drawn articles. A thermoplastic sheet covers each mold facet and is held in place by a vacuum groove located on the upper mold facet section. The material is shaped by actuating an assist plug in combination with a controlled evacuation of air from the mold cavity.

Manlove also suffers from numerous drawbacks. For example, the static upper mold facet section is situated above the mold cavity. This means that the material is formed over the static upper mold facet and then into the lower mold cavity, resulting in poor mold definition. Also, the static upper and dynamic lower mold facet configuration substantially limits production speed and increases waste, i.e., results in larger amounts of unused "trim" that must be discarded or recycled. Further, the lack of proximity of the upper mold facet section relative to the lower mold facet section prevents the upper mold facet section from being an effective means for influencing the temperature of the thermoplastic material within the mold cavity, in particular the portion that is formed into the article. The mold facet configuration also encounters alignment difficulties at high temperatures due to thermal expansion, which effectively limits the device to low temperature applications.

Gartland U.S. Pat. No. 4,469,270 describes a discontinuous thermoforming apparatus having a mold for thermoforming a plastic article having a flange portion. Vacuum and/or pressurized gas is used to conform a sheet to the shape of the heated mold. External cooling means are provided to maintain a portion of the flange of the article at a temperature that is said to be insufficient to induce undesirable thermal crystallization. This portion of the article preferably has a degree of crystallinity of not more than 10% to improve adhesion of lidding films to the article. The remaining portions of the flange and the remainder of the article are said to preferably have the same average crystallinity.

It would be desirable to develop a continuous process and apparatus for thermoforming articles having excellent heat resistance and dimensional stability. It also would be desirable to develop a continuous process and apparatus for thermoforming articles that exhibit excellent stress relaxation and that do, not undergo appreciable distortion during cooling. It would be especially desirable to develop a process and apparatus capable of faster production times while substantially avoiding distortion, even for the production of larger sized articles.

SUMMARY OF THE INVENTION

According to one embodiment of the present invention, a continuous process for preparing a thermoformed article comprises extruding a thermoplastic layer through an extrusion die to form an extrudate in a substantially non-oriented state. The extrudate is contacted with a mold surface, such as a mold cavity (female mold) or a male mold. A stripper plate is disposed adjacent to the mold surface for controlling the temperature of proximate areas of the extrudate, e.g., the area that is formed into the flange portion of a container. The stripper plate optionally is also used for assisting in separating the articles from the mold surface by lowering the entire mold relative to the stripper plate. The extrudate remains in contact with the mold surface for a time sufficient to form the article. Ovenable containers and other articles requiring high temperature resistance typically are heat-set.

The temperature of the mold surface is controlled to maintain the extrudate in a thermoformable state. The mold surface temperature or temperature gradient is controllably selected to induce a predetermined degree of crystallinity or a predetermined crystallinity gradient in the article. The temperature of the mold surface thus is dependent on the physical and chemical properties of the thermoplastic material(s) used, as well as the desired properties of the final article. The stripper plate is maintained at a different (usually lower) temperature than the mold surface to control thermally induced crystallinity in proximate portions of the article. The temperatures of the mold and the stripper plate are suitably selected to achieve stress relaxation in the article, which permits the article to be separated from the mold without or substantially without distortion, independent of the level of thermally induced crystallinity.

In an alternative embodiment of the present invention, a multi-layered article is formed in a continuous process by co-extruding at least two distinct thermoplastic materials, followed by thermoformning under the conditions as described above. In one preferred embodiment, the co-extrudate comprises a polar thermoplastic layer, an intermediate tie layer, and a non-polar thermoplastic layer. The polar layer (e.g., PET) can form the external surface of the article, while the non-polar layer (e.g., polyethylene) can form the internal surface of the article, for example to provide improved sealing properties with various lidding materials, especially using gas flushed sealing or modified atmosphere packaging (MAP). The present invention also is directed to a continuous apparatus for thermoforming multi-layered articles.

According to another aspect of the present invention, a thermoplastic polymeric composition comprises an alkylene terephthalate or naphthalate bulk polymer, an additive, and a compatibilizer/emulsifier/surfactant (CES). The additive comprises a substantially amorphous co-polymer of ethylene and an acrylate. The CES comprises a grafted or backbone co-polymer or ter-polymer of ethylene and a glycidyl acrylate, maleic anhydride, or mixture thereof, and optionally an acrylate selected from the group consisting of methacrylate, ethylacrylate, propylacrylate, butylacrylate, ethylhexylacrylate, and mixtures thereof. When the composition is heat set and formed into a layer having a thickness of about 10 to 15 mils, the article preferably has a Gardner toughness (failure energy) at 73° F. (22° C.) of at least 110 in.-$lb_f$, and at −20° F. (−29° C.) of at least 100 in.-$lb_f$. Surprisingly, the compositions exhibit improved toughness both at room temperature as well as at low temperatures.

According to another aspect of the invention, a polyester-based thermoplastic composition has a high retained viscosity following heat setting. In particular, the heat set composition preferably has a final intrinsic viscosity that is at least about 70% of the initial intrinsic viscosity of the bulk polymer. The high level of retained viscosity permits the conversion of polyesters having lower initial intrinsic viscosity, including resins that heretofore were unusable in food grade and other applications.

The continuous thermoforming process of the present invention permits the sheet to be formed without the need for tensioning or orienting, resulting in significantly improved product definition and, especially, retained product definition. It is particularly preferred that the sheet not be tensioned or oriented in either direction so as to essentially eliminate post-mold distortion. The process also improves accuracy and precision of product trimming by reducing distortion normally attendant with changes in thermally induced crystallinity as the sheet is heated and cooled during processing. As a result, the articles can be separated from the mold more rapidly following forming, which facilitates faster overall production rates.

The process of the present invention also permits more precise control of thermally induced crystallinity in the articles. The degree of crystallinity in products can be tailored to a particular application, e.g., in the manufacture of food containers such as microwave-ovenable containers, dual-ovenable containers, and the like. Significantly, the degree of crystallinity in the thermoformed article is not governed by manufacturing limitations. For example, unlike conventional continuous thermoforming devices, no minimum degree of crystallinity is required to enable the articles to be separated from the mold without distortion. Rather the degree of crystallinity in an article can be selectively controlled in accordance with a degree most suitable for a particular application.

The present invention overcomes many of the limitations associated with the prior art. For example, the present invention permits the conversion of lower melt strength materials, as well as the conversion of a variety of thermoplastic materials at a much higher rate. Polyesters having relatively low crystallinity rates and polyesters having relatively high crystallization rates can be used separately or in combination under the conditions described herein. In addition, the present invention permits the conversion of polyesters having lower initial intrinsic viscosity, including grades of resins that previously could not be used in food grade and other applications requiring high tolerances. Further, the present invention permits dissimilar materials (e.g., polar and non-polar) to be processed in co-extruded form.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1:
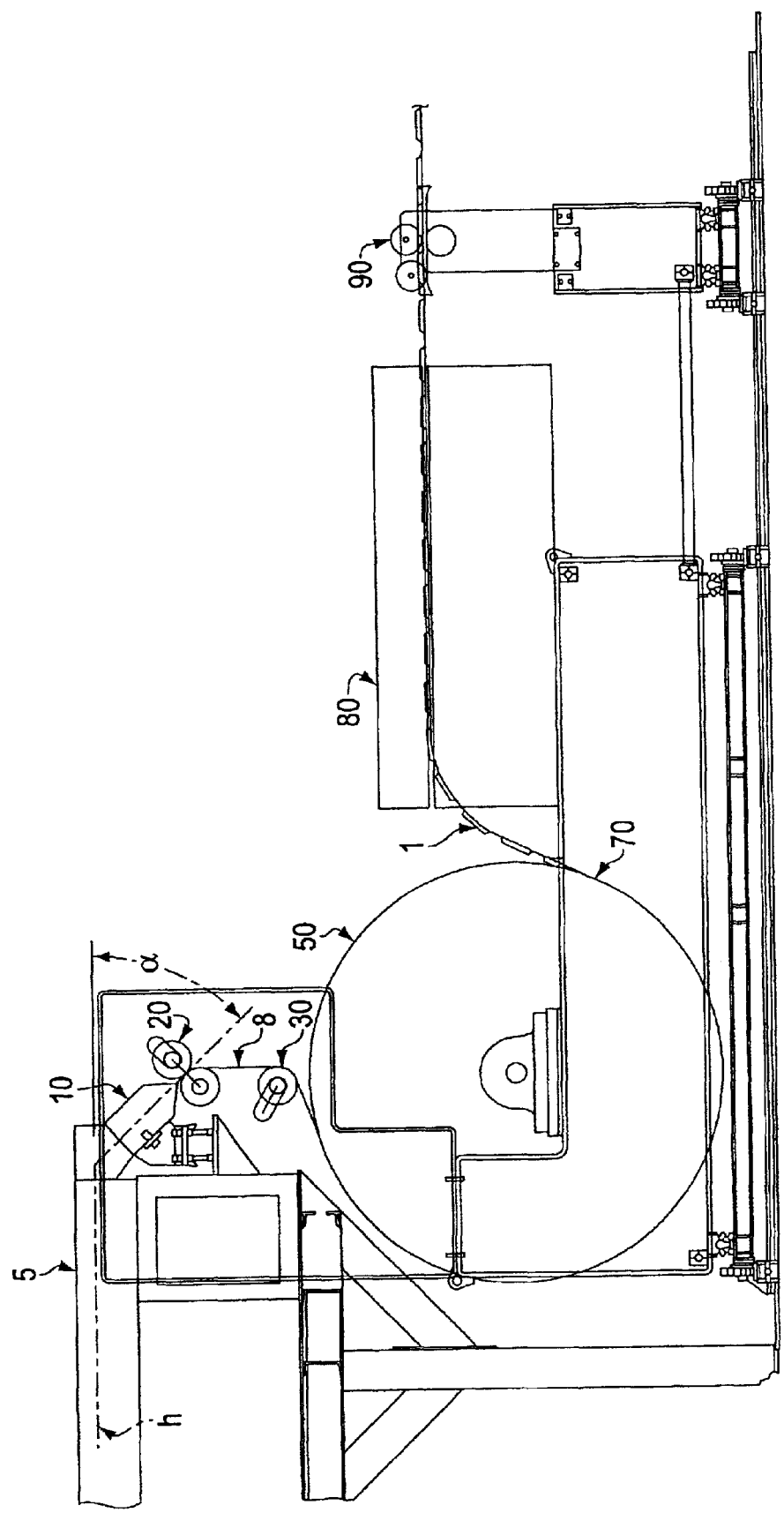
FIG. 1 is an illustration of a continuous melt phase thermoformer in accordance with one embodiment of the invention.

A wide variety of thermoplastic materials can be used in the continuous thermoforming process of the present invention. Preferred thermoplastic materials include, by way of example, polyesters such as polyethylene terephthalate (PET). The thermoplastic materials may include, in whole or in part, virgin polymers, reprocessed or recycled polymers, post-consumer waste, and combinations thereof As used herein, "reprocessed" and "recycled" each refer to materials that are unused in a given process cycle, typically the "trim" portions of the web around the article-forming portions. The reprocessed materials typically are collected, re-ground, and then mixed with virgin materials.

In many applications, it is desirable to use reprocessed materials not only for cost savings, but also to provide more favorable kinetics to selectively control the level of thermally induced crystallinity. For example, virgin and reprocessed polyesters, such as PET, can be combined at a ratio of virgin polyester to reprocessed polyester of from about 1:4 to about 4:1 by weight, more typically from about 1:2 to about 2:1. In one preferred embodiment, virgin PET and reprocessed PET are combined at a weight ratio of about 1:1.

The thermoplastic polymer(s) ("bulk polymer(s)") can be homopolymers, co-polymers, or blends thereof, and may be straight-chained, branched, or mixtures thereof. In addition, blends of polymers having varying molecular weights and/or intrinsic viscosity (I.V.) may be used. When PET is used, I.V. most often ranges from about 0.5 to 1.2. The polymers may be branched by inclusion of small quantities of trihydric or tetrahydric alcohols, or tribasic or tetrabasic carboxylic acids, examples of which include trimellitic acid, trimethylol-ethane, trimethylol-propane, trimesic acid, pentaerythritol and mixtures thereof. The degree of branching preferably is no more than about 3%. It has been found that blends of homopolymers and co-polymers are particularly desirable to provide overall kinetics more favorable for controlling thermally induced crystallinity.

In one preferred embodiment, a thermoplastic composition comprises a bulk polymer, an additive, and a compatibilizer/emulsifier/surfactant (CES). The thermoplastic composition is especially useful in the preparation of articles having high dimensional stability and high temperature resistance, which are particularly desirable attributes in food-grade applications (e.g., conventional-, convection-, microwave-, and dual-ovenable containers).

Unless otherwise indicated, all percentages set forth herein are weight percentages based on the total weight of the thermoplastic composition.

As used herein alone or as part of another group, the term "alkyl" or "alk" denotes straight and branched chain saturated hydrocarbon groups, preferably having 1 to 20 carbon atoms, more usually 1 to 6 carbon atoms. Exemplary groups include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, combinations thereof and the like.

The term "cycloalkyl" as used herein alone or as part of another group, denotes saturated cyclic hydrocarbon ring systems, preferably containing 1 to 3 rings and 3 to 7 carbons per ring. Exemplary groups include cyclopropyl, cyclobutyl, cyclopentyl, cyclohexyl, cycloheptyl, cyclooctyl, cyclodecyl, cyclododecyl, adamantyl and combinations thereof.

The term "alkylene" as used herein denotes divalent, unsaturated hydrocarbon groups of the overall formula $-C_nH_{2n}-$, wherein n preferably is from 1 to 10. Exemplary groups include methylene, ethylene, and propylene. Such groups represent alkyl groups as defined above from which another hydrogen has been removed.

Intrinsic viscosity (I.V.) as used herein is defined as the limit of the fraction $\ln(v)/C$ as C, the concentration of the polymer solution, approaches 0, wherein v is the relative viscosity which is measured at several different concentrations in a 60/40 mixed solvent of phenol and tetrachloroethane at 30° C. Units for I.V. are dl/g unless otherwise indicated. "Initial intrinsic viscosity" and similar terms are used to refer to the I.V. of a polymeric material before processing (e.g., before thermoforming or heat setting). "Final intrinsic viscosity" and similar terms are used to refer to the I.V. of a polymeric material subsequent to thermoforming. Unless otherwise clear from its context, intrinsic viscosity (I.V.) refers to the entire composition, e.g., virgin materials plus any recycled or reprocessed materials, etc.

The bulk polymer can include, in whole or in part, an alkylene terephthalate or naphthalate polyester. Polyalkylene terephthalates can be prepared by the polycondensation reaction of terephthalic acid, or a lower alkyl ester thereof, ;and aliphatic or cycloaliphatic $C_2-C_{10}$ diols. Such reaction products include polyalkylene terephthalate resins, including, but not limited to, polyethylene terephthalate, polybutylene terephthalate, polytetramethylene terephthalate, and copolymers and mixtures thereof. As is known to those skilled in the art, these polyester resins may be obtained through the polycondensation reaction of terephthalic acid, or a lower alkyl ester thereof, and an alkylene diol. For example, polyethylene terephthalate can be prepared by polycondensation of dimethyl terephthalate and ethylene glycol following an ester interchange reaction. Non-limiting examples of suitable polyesters include polyethylene terephthalate (PET), polybutylene terephthalate (PBT), polyethylene naphthalate (PEN), polycycloterephthalate (PCT), polycycloterephthatlic acid (PCTA), (poly) ethylene-co-1,4-cyclohexanedimethylene terephthalate (PETG), polytrimethylene terephthalate (PTT), and co-polymers and mixtures thereof.

The bulk polymer may contain up to about 25 mol % of other aliphatic dicarboxylic acid groups having from about 4 to about 12 carbon atoms as well as aromatic or cycloaliphatic dicarboxylic acid groups having from about 8 to about 14 carbon atoms. Non-limiting examples of these monomers include iso-pbthtalic acid (IPA), phthalic acid, succinic acid, adipic acid, sebacic acid, azelaic acid, acyclohexane diacetic acid, naphthalene-2,6-dicarboxylic acid, 4,4-diphenylene-ldicarboxylic acid and mixtures thereof.

The bulk polymer also may contain up to about 25 mol % of other aliphatic $C_2$–$C_{10}$ or cycloaliphatic $C_6$–$C_{21}$ diol components. Non-limiting examples include neopentyl glycol, pentane-1,5-diol, cyclohexane-1,6-diol, cyclohexane-1,4-dimethanol, 3-methyl pentane-2,4-diol, 2-methyl pentane-2,4-diol, propane-1,3-diol, 2-ethyl propane-1,2-diol, 2,2,4-trimethyl pentane-1,3-diol, 2,2,4-trimethyl pentane-1,6-diol, 2,2-dimethyl propane-1,3-diol, 2-ethyl hexane-1,3-diol, hexane-2,5-diol, 1,4-di(β-hydroxy-ethoxy)benzene, 2,2-bis-(4-hydroxypropoxy-phenyl)propane, and mixtures thereof.

Linear alkylene terephthalate or naphthalate homopolymers typically exhibit faster crystallization than do co-polymers. Branched polymers typically yield higher melt strengths. As will be appreciated by those skilled in the art, mixtures of branched- or unbranched homopolymers and/or co-polymers, optionally having varying molecular weights and/or I.V., can be selected to obtain a polymer having the most suitable properties for a particular application.

Polymers having lower I.V. generally have lower molecular weights, shorter chain lengths, and exhibit faster crystallization kinetics, resulting in better heat setting properties (e.g., higher dimensional stability). In addition, lower-I.V. polymers generally are less expensive, and have lower extrusion melt temperatures, resulting in less degradation, faster stress relaxation time, reduced molding time and reduced production time. However, such polymers traditionally are considered unsuitable for making ovenable containers and other articles requiring high tolerances because of poor toughness, low melt strength, poor web handling characteristics, and poor ductility. The present invention advantageously overcomes the drawbacks conventionally associated with the use of lower-I.V. polymers, thereby permitting their use in such applications as food-grade, heat-set products.

The bulk polymer of the present invention may contain various impurities. Preferably, impurities that hinder crystallization are held to a minimum. Examples of such impurities include acetylaldehyde, diethylene glycol, and isopropyl aldehyde, with preferred maximum concentrations of these components being 2 wt %, 2 ppm, and 5 wt %, respectively, based on the total weight of the bulk polymer. Skilled practitioners can easily identify the impurities that hinder crystallization and the concentration at which they do so. Other additives known in the art may be included in the composition up to about 30% by weight. Non-limiting examples of such additives include antioxidants, flame retardants, reinforcing agents such as glass fiber, asbestos fiber and flake, mineral filters, stabilizers, nucleating agents, ultraviolet light stabilizers, heat and light stabilizers, lubricants, dyes, pigments, toners, mold release agents, fillers, such as glass beads and talc, and the like. Minor amounts of one or more additional polymers (e.g., up to about 10 percent by weight) optionally can be incorporated in the present composition, such as polyamides, polycarbonates, polyethylenes, and polypropylenes. Antioxidants, thermal stabilizers, fillers, pigments and flame retardant additives, when used, preferably do not exert any adverse effect on impact strength.

The additive preferably comprises a co-polymer of an ethylene monomer and a co-monomer that forms a polar moiety such as an acrylate co-monomer. The additive imparts toughness to the thermoplastic composition and makes the composition particularly resistant to thermal treatments that traditionally result in toughness reduction. The polar or semi-polar nature of the additive also improves dispersion and mixing. Examples of suitable co-monomers include acrylates such as methacrylate, butylacrylate, ethylacrylate, ethylhexyl methacrylate, and mixtures thereof. The concentration of the co-monomer should be between (a) a minimum which depends upon the identity of the acrylate and (b) an amount slightly less than the amount that makes the co-polymer amorphous or substantially amorphous. For example, when methacrylate is used, its concentration preferably is from about 20 wt % to about 35 wt %, based on the total weight of the ethylene/methacrylate co-polymer. Typical preferred acrylate concentrations range from about 7 wt % to about 40 wt % and more typically from about 17 wt % to about 35 wt %, based on the total weight of the co-polymer. The average molecular weight of the co-polymer typically ranges from about 50,000 to about 120,000. The melt flow index of the additive preferably is less than about 7, more preferably is less than about 3, and even more preferably is less than about 2 g/10 min. The additive preferably has a relatively low melting point and is thermally stable, e.g., does not degrade during extrusion of the thermoplastic composition or during re-drying of the thermoplastic composition in air for extended times.

The concentration of the additive component in the thermoplastic composition may be suitably selected according to properties required for desired end uses of the composition. Typically, the concentration of the additive is from about 4 wt % to about 40 wt %, more typically from about 4 wt % to about 30 wt %, and even more typically from about 6 wt % to about 15 wt %, based on the total weight of the composition.

The additive co-polymer most often has a major portion of ethylene, typically at least about 60 wt % and more usually at least about 65 wt %, based on the total weight of the additive. The co-polymer also may contain one or more alpha-olefins having 3 to 10 or more carbon atoms. Illustrative examples include propylene, butene-1, pentene-1,3-methylbutene-1, hexene-1, octene-1, decene-1, 4,4-dimethylpentene-1, 4,4-diethyl-hexene-1, 3,4-dimethylhexene-1, 4-butyl-1-octene, 5-ethyl-1-decene, 3,3-dimethyl-butene-1, mixtures thereof and the like. The preferred ethylene co-polymer comprises up to about 5 wt % of other alpha-olefins as described above. In addition, the additive optionally contains a core-shell toughener. Examples of core-shell tougheners that can be used are described in U.S. Pat. No. 5,409,967, the disclosure of which is incorporated by reference herein in its entirety.

The compatibilizer/emulsifier/surfactant (CES) preferably is a grafted or backbone-based co-polymer or ter-polymer comprising ethylene and a glycidyl acrylate, such as glycidyl methacrylate, and/or maleic anhydride. The CES co-polymer or ter-polymer preferably also includes other acrylates such, as methacrylate, ethylacrylate, propylacrylate, butylacrylate, ethylhexylacrylate, etc. Suitable exemplary amounts of glycidyl acrylate, maleic anhydride, or mixture thereof, range from about 0.05 wt % to about 12 wt %, typically from about 0.5 wt % to about 10 wt %, and more typically from about 0.8 wt % to about 9 wt %, based on the total weight of the co-polymer or ter-polymer. A grafted co-polymer or ter-polymer typically will have less glycidyl acrylate or maleic anhydride (e.g. from about 0.2 wt % to about 1.5 wt %), whereas a backbone-based co-polymer or ter-polymer can have higher amounts of glycidyl acrylate and/or maleic anhydride, e.g., as indicated above. Suitable exemplary amounts of acrylate range from 0 to about 40 wt %, preferably from about 10 wt % to about 30 wt %, and even more preferably from about 20 wt % to about 35 wt %, based on the total weight of the co-polymer or ter-polymer.

Typically, the concentration of the CES in the thermoplastic composition is from about 0.1 wt % to about 8 wt %, more typically is from about 0.2 wt % to about 6 wt %, and even more typically is from about 0.4 wt % to about 4 wt %. The melt flow index of the CES preferably is less than about 20, more preferably is less than about 15, and even more preferably is less than about 10 g/10 min.

In one preferred embodiment of the present invention, the CES comprises a ter-polymer of ethylene with about 8 wt % glycidyl methacrylate and about 25 wt % methacrylate or butylacrylate, based on the total weight of the ter-polymer. In another preferred embodiment, the CES comprises a co-polymer of ethylene with about 6 wt % glycidyl methacrylate, based on the total weight of the co-polymer. In another preferred embodiment, the CES comprises a ter-polymer of ethylene with about 2 wt % glycidyl methacrylate and from about 17 to 25 wt % methacrylate, based on the total weight of the ter-polymer. In yet another preferred embodiment, the CES comprises a ter-polymer of ethylene with about 3 wt % maleic anhydride and about 17 wt % butylacrylate, based on the total weight of the ter-polymer.

In an alternative preferred embodiment, the CES (as previously defined) is melt blended with a polar co-polymer, for example a co-polymer of ethylene and a $C_1$–$C_{12}$ acrylate, such as ethylene methacrylate (EMA) or ethylene butylacrylate (EBA). For example, the CES and polar co-polymer can be melt blended at a weight ratio of about 1:9 (CES to co-polymer). This embodiment improves uniformity of the CES and is particularly useful in co-extruding the CES as a separate tie layer in a multi-layered article, as discussed in greater detail below.

Preferred thermoplastic compositions of the present invention exhibit not only improved toughness, but also improved low-temperature toughness. When the composition is heat set and formed into a layer having a thickness of about 10 to 15 mils, articles typically exhibit a Gardner toughness (failure energy) at 73° F. (22° C.) of at least 110 in.-$lb_f$ and preferably at least about 115 in.-$lb_f$; and also typically exhibit a Gardner toughness at –20° F. (–29° C.) of at least 100 in.-$lb_f$, preferably at least about 105 in.-$lb_f$ (see FIG. 7).

For compositions heat-set at a thickness of about 15 to 25 mils, the Dynatup Impact toughness rating at 70° F. (21° C.) preferably is at least 125 and at –20° F. (–29° C.) preferably is at least 120. Preferably, the Dynatup Impact toughness rating at 70° F. (21° C.) is at least 130 and at –20° F. (–29° C.) is at least 125. Surprisingly, compositions of the present invention were found to have Dynatup Impact toughness rating at –20° F. (–29° C.) of at least 130, 140, 150, and even higher.

Preferred thermoplastic compositions of the present invention also exhibit improved retained I.V. In particular, the heat set article has a final intrinsic viscosity that is at least about 70%, preferably at least about 75%, and even more preferably at least about 80% of the initial intrinsic viscosity of the thermoplastic composition. The difference between initial I.V. and final I.V. preferably is less than about 0.15, more preferably less than about 0.12, even more preferably less than about 0.1.

It is particularly surprising that the preferred compositions of the present invention exhibit the improved toughness, as discussed, while at the same time exhibiting improved retained viscosity or final viscosity. The present invention also enables the conversion of lower I.V. polyesters in a continuous process into products exhibiting toughness, and especially low temperature toughness, that heretofore could not be obtained in a continuous process.

Heat setting is a term describing the process of thermally inducing crystallization of a polyester article in a restrained position. In the practice of the invention, heat-setting can be achieved by maintaining intimate contact of the solid or cellular sheet with the heated mold surface for a sufficient time to achieve a level of crystallinity which gives adequate physical properties to the finished part. For containers to be used in high temperature food applications, a level of crystallinity above 15% is preferable for adequate dimensional stability during demolding operations, and more preferably is above about 20% to yield parts with excellent dimensional stability and impact resistance.

The heat-set part can be removed from the mold cavity by known means. One method, blow back, involves breaking the vacuum established between the mold and the formed sheet by the introduction of compressed air. In a typical commercial thermoforming operation, the part is subsequently trimmed and the scrap ground and recycled.

Since a partially-crystalline finished article is necessary for good dimensional stability at high temperatures, knowledge of the degree of crystallinity or percent of crystallinity is of considerable importance. The crystallinity of the polymer in such articles will normally be measured by Differential Scanning Calorimetry (DSC). The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. In PET, for example, the crystallization temperature or crystallization onset can be visually observed as the point at which a substantially amorphous, non-oriented sheet of polymer changes from a translucent, hazy appearance to a white appearance.

The term glass transition temperature ($T_g$) is used herein to refer to that temperature or temperature range at which a change in slope appears in the volume versus temperature curve for a polymer, and to define a temperature region below which the polymer exhibits a glassy characteristic and above which the polymer exhibits a rubbery characteristic. The glass transition temperature of polyethylene terephthalate is about 70 to 80° C.

The temperature of the mold surface should be selected in accordance with the properties of the bulk polymer(s) and the desired level of crystallinity in the thermoformed article or a region thereof The temperature of the mold surface should be above the softening point and stretching point of the bulk polymer(s). Such temperatures promote stress relaxation in the thermoplastic material, which in turn eliminates or substantially eliminates post-mold distortion. Preferably, the lowest suitable temperature for the mold surface or a region thereof is selected, so as to avoid the need for additional cooling.

The stripper plate should be maintained at a temperature that is different than the temperature(s) of the mold surface. Preferably, the stripper plate is maintained at a temperature that differs from the temperature of an adjacent portion of the mold surface by a predetermined amount. The difference in temperature can vary over a wide range, and depends on such factors as the level of crystallinity and the end level of heat resistance desired in the product. The difference in temperature most often ranges from about 1° C. to about 100° C., more usually from about 5° C. to about 68° C.

When female molds (mold cavities) are used and/or when high temperature resistance is desirable in the article, it often is preferable to maintain the stripper plate at a temperature lower than the temperature of the mold surface. One of the advantages of using female molds is that in-mold shrinkage, associated with high levels of crystallinity, pulls the thermoplastic material away from the mold rather than into the mold, the latter of which creates stresses in the article. Preferably, the stripper plate temperature is not lower than the glass transition temperature ($T_g$ of the thermoplastic material. Stripper plate temperatures below the glass transition temperature may require re-drying and/or re-crystallization of the thermoplastic material, which can increase process time and cost. The cooler stripper plate not only selectively limits thermally induced crystallinity in adjacent (e.g., flange) portions of the article, but also increases web stiffness, improves web alignment, and can improve article extraction (in a preferred embodiment discussed below).

When male molds are used and/or when amorphous or substantially amorphous products are desired (including many applications in which high temperature resistance is not required), it often is preferable to maintain the stripper plate at a higher temperature than the temperature of the mold surface. Where high temperature resistance is not required, blends of materials (e.g., virgin and reprocessed; homopolymers and co-polymers) often can be converted at lower mold temperatures, which translates to higher production speed and lower production cost. If transparency is desired, reprocessed materials usually are not used, and the thermoplastic material can be further processed, as needed, in accordance with techniques well known to those skilled in the art. It also is contemplated that a male mold can be used as a plug assist.

In accordance with a preferred embodiment of the invention, the bulk polymer comprises polyethylene terephthalate (PET) having an I.V. of less than 0.95, 0.90, 0.85, or 0.80 (available from Shell Polyester). The components (e.g., bulk polymer(s), additive(s), CES, etc.) can be blended in either a batch or continuous manner. The order of addition of the components is not critical. Preferably, dry components are blended simultaneously or sequentially, followed by physically dry blending the bulk polymer by weight. The components then can be dried, melt mixed, devolitized, and processed through an extrusion die to form a sheet of desired thickness, using a single screw extruder, a twin screw extruder, or a multi-machine system (co-extruder). It may be advantageous to use multiple extruders, either of the same type or of different types. For example, a twin-screw extruder can be used in combination with a single-screw extruder to improve mixing of reprocessed or recycled polymers, additives, and the like. In some instances it may be necessary to use a twin-screw extruder in applications requiring especially high outputs.

The residence time of the composition in the extruder(s) can vary over a wide range, depending on such factors as the properties of the components and the type of extruder(s) used, and is not critical to the practice of the invention. The residence time preferably is kept to a minimum time that is sufficient to obtain proper mixing of the components. Generally, residence times will be higher in single-screw extruders and lower in twin-screw extruders. Residence time sometimes can be as much as 6 minutes.

It also is preferred that shear be kept to a minimum. It is preferred that the CES functions to break down particle size, rather than using shear to break down particle size. Dispersive mixing optionally is performed and, when performed, typically is done at the initial stage of mixing. It is preferred that no more than about 10–20% of mixing be dispersive, with the balance being distributive mixing, based on the total mixing time. Dispersive mixing can be used, for example, to break down particle size of pigments, fillers, inorganic materials, and the like. Dispersive mixing most often has a shear rate of from about 400 to 500 $sec^{-1}$ and distributive mixing most often has a shear rate of from about 200 to 400 $sec^{-1}$.

Optionally, a multi-machine system can be used to apply a skin on one or both sides to form a multi-ply article, e.g., to enhance sealing or aesthetics, or to provide gloss, color, and the like. For example, because higher-crystallinity films usually are more difficult to seal, it may be advantageous to apply a second, more amorphous film, such as PETG or an iso-phthalic acid (IPA)/PET co-polymer, over a more crystalline first layer.

Articles formed by the continuous process of the present invention can have a wide variety of shapes and dimensions, facilitating a wide variety of end uses. Shallow articles, such as trays, generally can be processed at higher speeds. As will be apparent to those skilled in the art, the manufacture of articles having a greater area stretch ratio (i.e., deeper drawn parts) often requires the use of a plug assist Typically, the area stretch ratio ranges from about 1.25:1 to about 3:1, more usually from about 1.5:1 to about 3:1, in accordance with the present invention.

With reference to FIG. 1, in accordance with a preferred embodiment of the present invention, a plastic material to be thermoformed is processed through an extrusion die 10 to form a plastic sheet 8 of desired thickness. The extrusion die 10 receives molten thermoplastic material from an extruder 5. The extrusion die forms a plastic sheet 8 that exits the die 10 in a plane disposed at any suitable angle α relative to the horizontal axis h. To provide thermoformed articles having excellent dimensional stability, especially at elevated temperatures, it is particularly preferred that the plastic sheet 8 not be stretched or oriented in either direction. The temperature of the material exiting the die 10 depends on such factors as the melting point of the resin(s), and typically ranges from about 450 to 530° F. (about 232 to 276° C.).

Upon exiting the extrusion die 10, the plastic sheet 8 optionally is fed over one or more rolls 30 or pairs of rolls 20, 30 rotatably supported on the apparatus. The rolls 20, 30 can be used to shape and cool the surface of the plastic sheet 8 to establish a thermal gradient therein. The plastic sheet 8, however, should remain at a temperature suitable for vacuum forming, i.e., in a molten or thermoformable state. The rolls 20, 30 also can be used to laminate additional plastic sheet(s), to emboss the article, and the like. As will be apparent to those skilled in the art, other types of devices additionally or alternatively can be used to treat the plastic sheet 8, e.g., subsequent to extrusion and prior to thermoforming, without departing from the spirit or scope of the invention.

Figure 3B:
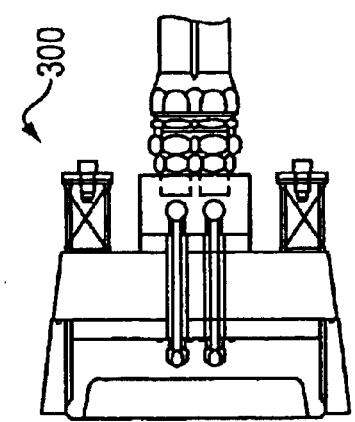
FIG. 3 is an illustration of a flat containing a plurality of molding cavities in accordance with a preferred embodiment of the invention.
Figure 3A:
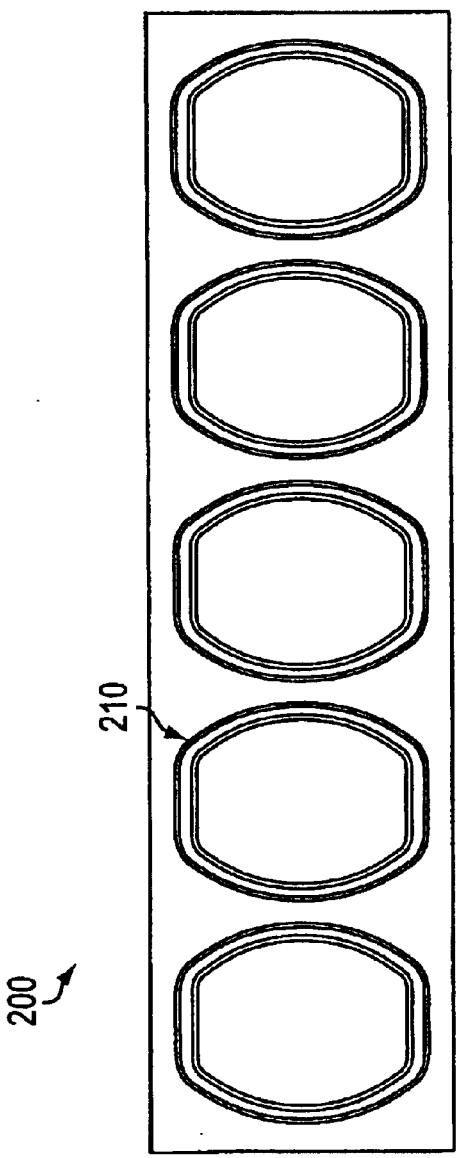
Figure 4:
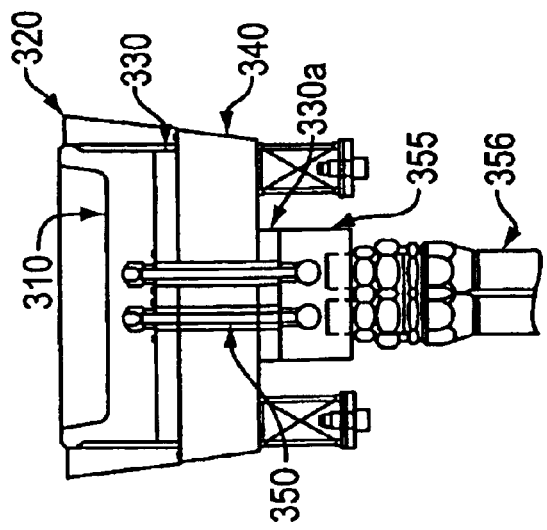
FIG. 4 is a side view of a mold member.

With reference to FIGS. 1, 3, and 4, the plastic sheet 8 is brought into contact with a rotating wheel 50 having a plurality of mold members 300 each having a forming cavity 310 (female mold). As will be understood by those skilled in the art, the forming cavity 310 is perforated or vented so that vacuum may be drawn in the mold. A vacuum device (not illustrated) is provided for drawing a vacuum through perforations (not illustrated) in the forming cavity 310. The vacuum underpressure draws the plastic sheet 8 into the forming cavity 310 to form an article in the shape of the forming cavity 310. In this way, the plastic sheet 8 is drawn into contact with the mold while any air trapped between the plastic sheet 8 and the forming cavity 310 is removed through the perforations.

As illustrated in FIG. 3, in accordance with one embodiment of the invention, a flat 200 contains five parallel, spaced mold members 210 for receiving the extruded sheet 8. It will be apparent to those skilled in the art that fewer or more mold members 210 can be provided on a flat 200 as desired. A flat 200, can contain as few as one mold member, and there is no upper limit contemplated on the number of mold members 210 per flat 200. Selection of a suitable number of mold members 210 per flat 200 can be made according to such factors as, for example, cost, throughput, size of the thermoformed articles, size of the apparatus, energy requirements, etc. The rotating wheel preferably is of a size suitable to contain a plurality (e.g., 10 to 30 or more) of flats 200 arranged around its circumference. In one preferred embodiment, the rotating wheel contains 28 flats each having five mold members 210.

In accordance with one embodiment of the invention, while the plastic sheet 8 is in contact with the forming cavity 310, regions of the forming cavity 310 are selectively heated so as to increase the rate of thermal crystallization relative to other regions to achieve the desired degree of crystallinity in each region. Regions of the forming cavity 310 also can be selectively cooled to decrease the rate of thermal crystallization in the region. As will be understood by the art, the degree of crystallinity imparted to a particular region of the article is a function of not only the thermoforming temperature, but also the identity and properties of the thermoplastic material, e.g., intrinsic viscosity (I.V.) and the like, and its thickness in the region.

The time that the sheet remains in contact with the mold surface at the molding temperature can vary over a wide range and depends on a number of factors, such as the molding temperature, the dimensions of the mold, the number of molds, and the like. In a preferred apparatus of the present invention, the time at the molding temperature typically ranges from about 10–30 seconds, more usually from about 10–20 seconds.

The temperature in the mold cavity 310 can be controlled by any suitable heat transfer elements, e.g., heating, cooling, and/or insulating elements. For example, as illustrated in FIG. 4, a fluid such as oil can be supplied to a manifold 355 by hoses 356, and delivered through tubes 350 and into channels (not illustrated) extending through the mold 310. The configuration and location of the channels can be suitably selected to maintain a desired temperature or temperature distribution in the mold cavity 310.

Figure 5:
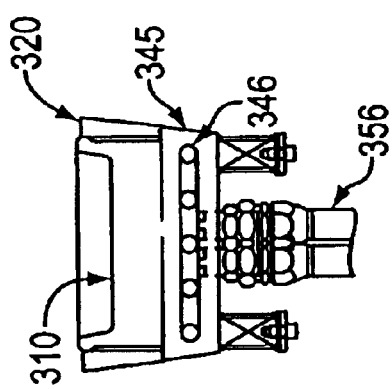
FIG. 5 is a side view of a mold member having electric heating elements in accordance with an alternative embodiment of the invention.

FIG. 5 illustrates another embodiment in which a heat transfer fluid is circulated through channels 346 extending through a heat transfer plate 345, which can be bolted or otherwise attached to the mold 310. In this embodiment, the mold cavity 310 is heated by conduction. The mold 310 and/or heat transfer plate 345 also may be equipped with optional electric heating elements (not illustrated) to selectively heat portions of the forming cavity 310. In any embodiment, fluid (e.g., oil) and electric heating elements can be used separately or in combination, or any other suitable means can be used for selectively heating and/or cooling portions of the forming cavity 310 in accordance with the present invention.

Figure 6:
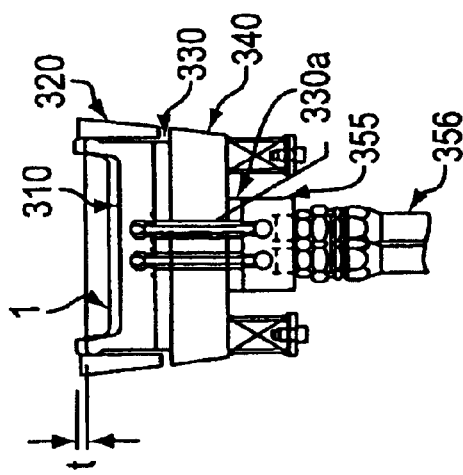
FIG. 6 is an illustration of a mold member having a stripper plate in the mechanical ejection position.

As illustrated in FIG. 4, a predetermined temperature distribution in the forming cavity 310 and stripper plate 320 can be obtained by using an appropriate combination of heating, cooling, and insulating elements. Insulator blocks 330, 330a are attached to and disposed between the heated mold and the mounting plate 340, and between the mounting plate 340 and the hot oil manifold 355, respectively. In addition, a heat transfer medium, such as water, optionally is circulated through a circuit (not illustrated) provided in the mold mounting plate 340 to selectively cool the mounting plate 340 and the stripper plate 320. As illustrated in FIGS. 4-6, the stripper plate 320 preferably is tapered to assist in establishing a desired temperature distribution therein. The top portion of the stripper plate 320 is the thickest, and thus the coolest portion. A heat transfer pin (not illustrated) also may be disposed in the mold 310 , e.g., parallel to the stripper plate 320 , to establish a desired temperature distribution in the stripper plate 320.

A feedback control device, such as a programmable logic controller (PLC), optionally is provided in combination with the heating and/or cooling means for controlling the temperature in the various portions of the forming cavity 310. Such temperature control devices can increase the cost of the apparatus, but also can enable even more precise control of crystallinity in the various regions of the article, as well as improve consistency among articles produced by the apparatus.

In one embodiment, a thermoformed container has three distinct regions of thermally induced crystallinity. In this embodiment, the temperature distribution is such that the bottom portion of the forming cavity 310 is the hottest during thermoforming, typically from about 250 to about 450° F., while the sides and the upper portions of the forming cavity 310 are maintained at lower temperatures, with optional cooling. The bottom portion of the thermoformed article typically has greater than about 20% crystallinity, preferably from about 22% to about 35%. The bottom portion of the article thus has the highest heat resistance. The bottom portion of the article is substantially stress-free and maintains shaped-part (dimensional) stability, especially at elevated temperatures such as those typically encountered in cooking applications.

In this embodiment, the upper portion of the forming cavity 310 preferably is the coolest portion during thermoforming, resulting in a top (e.g., flange) region having lower thermal crystallinity. Crystallinity in the top region preferably is less than about 30% and more preferably is less than about 25%. The intermediate region of the article preferably is maintained at a thermoforming temperature between that of the bottom portion and that of the top portion of the forming cavity 310. The intermediate region of the thermoformed article thus has a degree of crystallinity between that of the bottom region and that of the top region. Within the intermediate region, a substantially uniform degree of crystallinity can be present, e.g., by maintaining a substantially uniform temperature within the intermediate region during thermoformning. Alternatively, the intermediate region can have a crystallinity gradient, e.g., which ranges from the degree of crystallinity in the bottom region to that in the top region. In many applications, however, it is undesirable to have an appreciable gradient in crystallinity over a region of the article. Of course, where an article has multiple regions of crystallinity, a minor gradient will exist between the regions. The gradient of crystallinity in the thickness direction of any given region of the article preferably is negligible.

The present invention has been described primarily with reference to female molds (mold cavities). It also is contemplated that male molds can be employed in an analogous manner. A reverse temperature profile can be employed for male molds to form articles having similar crystallinity or regions of crystallinity as described above for female molds. For some applications, it may be desirable to have an inversed crystallinity gradient compared to that previously described, e.g., a higher degree of crystallinity at the top portion of the article and a lower degree of crystallinity at the bottom portion.

It also may be desirable to use a male mold configuration for applications not requiring high heat resistance, so as to increase production speed. An example of such an application is the conversion of amorphous polyethylene terephthalate (APET) into transparent containers. In this embodiment, the stripper plate contacts the surface of the sheet forming the inside of the article, instead of the surface of the sheet forming the outside of the article, as typically is the case with the female mold configuration described above.

Other non-uniform distributions of crystallinity may be obtained so as to provide articles especially suited for particular purposes. It will be apparent to persons skilled in the art that the temperature and/or temperature gradient in various regions can be suitably adjusted by selective heating and/or cooling to obtain the desired degree of crystallization in each region. In one preferred embodiment, the predetermined temperature distribution in the mold results in thermoformed articles having at least two, and more preferably at least three, distinct regions of thermal crystallinity. Depending on such factors as the shape and the intended use of the thermoformed article, it may be advantageous to thermoform articles having four, five, six or even more distinct regions of thermal crystallinity.

In applications requiring high temperature resistance, the article is maintained in the forming cavity 310 for a time sufficient to form and heat-set the article. The article 1 then is separated from the forming cavity 310, e.g., at an ejection station 70, by action of the stripper plate 320. FIG. 6 illustrates the mold member 300 with the stripper 320 plate in the mechanical ejection position. The mold 310 is displaced (e.g., toward the axis of the rotating wheel 50) in relation to the stripper plate 320 by a distance 1 sufficient to separate the article 1 there from. By controlling the temperature of the stripper plate and not imparting tension to the web, the article 1 can be separated from the mold 310 without or substantially without distortion. The temperature-controlled stripper plate 320 also facilitates removal of the articles 1 in less time after forming, thereby increasing production rates.

The article 1 can be removed from the forming cavity 310 by any suitable means, with or without in-mold trimming. In one embodiment, the articles 1 and the web of plastic between them (the "trim") are separated from the forming cavity 310 as a unit. The web can be fed through a trim press guide 90 to trim press 100 to remove the trim from the articles 1. Alternatively, the articles 1 can be trimmed while still in the forming cavity 310 by a suitable in-mold trimming device (not illustrated). In either embodiment, the articles 1 can be treated in an optional post-mold conditioning/treatment unit 80 which may provide one or more of heat treatment, heat removal, perforating, or the like.

Cellular Sheets

The process and apparatus of the present invention can be used to process cellular sheets. Cellular sheeting can be made, for example, by mixing at least one inert gas with a molten thermoplastic resin composition in an extruder. This is done by simply injecting the inert gas into the molten resin in the extruder that is equipped with a sheet-forming die. The inert gas used in this process can be any gas that does not chemically react with the thermoplastic resin composition at the elevated processing temperatures required. Some representative examples of inert gases that can be used include nitrogen, carbon dioxide, helium, neon, argon, and krypton. For purposes of cost savings and solubilities, nitrogen, carbon dioxide, or mixtures thereof normally will be used as the inert gas.

A cellular sheet can be made with either a plasticating extruder or a melt extruder. Screw extruders of these types push the molten thermoplastic resin composition containing discrete cells of the inert gas through a metal die that continuously shapes the sheet into the desired form. In most cases, single screw extruders will be utilized. However, in some cases it may be desirable to utilize twin screw extruders or multiple screw extruders that perform essentially the same function.

In many cases it will be convenient to employ a plasticating extruder of the single screw design. The thermoplastic resin composition is fed into such a plasticating extruder by gravitational flow from a hopper into the screw channel. The thermoplastic resin composition fed into the plasticating extruder is initially in particulate solid form. The thermoplastic resin composition initially enters the solid conveying zone of the plasticating extruder. In the solid conveying zone, the solid resin is conveyed and compressed by a drag-induced mechanism. In the solid conveying zone, the resin is mixed, heated, and conveyed through the extruder toward the melting zone. This heating is provided by maintaining the barrel of the extruder at an elevated temperature. The barrel of the extruder is typically heated electrically or by a fluid heat exchanger system. Thermocouples are also normally placed in the metal barrel wall to record and to help control barrel temperature settings.

Melting occurs in the melting zone after the resin is heated to a temperature above its melting point. In the melting zone, melting, pumping and mixing simultaneously occur. The molten resin is conveyed from the melting zone to the melt conveying zone. The inert gas is injected into the molten resin in the melt conveying zone. In the melt conveying zone, pumping and mixing simultaneously occur. The molten resin in the melt conveying zone is maintained at a temperature well above its melting point. A sufficient amount of agitation is provided so as to result in an essentially homogeneous dispersion of inert gas bubbles throughout the molten resin. The molten resin entering the melt conveying zone from the melting zone is at a somewhat lower temperature and accordingly is of a higher viscosity. This essentially prevents the inert gas from back mixing through the extruder and escaping from the solid conveying zone via the hopper.

The molten thermoplastic resin composition in the melt conveying zone typically is pumped into a metering pump and finally extruded through a sheet-forming die. The metering pump and sheeting die are typically maintained at a lower temperature than that of the barrel surrounding the melt conveying zone to minimize rupture and diffusion of inert gas bubbles in the thermoplastic resin composition. The sheeting die is of a generally rectangular design that is quite wide and of a small opening. Upon exiting the sheeting die, the sheet extrudate will swell to a level that is dependent upon the melt temperature, the die length-to-opening ratio, and the shear stress at the die walls. In some cases, such as in the manufacture of clam shells, it is desirable to use a circular die and to extrude a tube that can be slit open and thermoformed. The cellular sheet produced typically is cooled without stretching by convected cold air or an inert gas, by immersion into a fluid bath, or by passage over chilled rolls. The cellular sheet produced is generally amorphous in nature.

The cellular sheet typically will contain a sufficient amount of inert gas cells to provide it with a density within the range of about 0.1 to about 1.25. In most cases, the cellular sheet will contain a quantity of inert gas cells to provide it with a density within the range of 0.2 to 1.1. It generally is preferred for the cellular sheet to have a density within the range of about 0.3 to about 1.0.

The cellular sheet can be thermoformed into heat-set, thin walled articles utilizing conventional thermoforming equipment. Such thermoforming typically is done by (1) preheating the substantially amorphous cellular sheet until it softens and positioning it over the mold; (2) drawing the preheated sheet onto the heated mold surface; (3) heat-setting the formed sheet by maintaining sheet contact against the heated mold for a sufficient time period to partially crystallize the sheet; and (4) removing the part out of the mold cavity. In currently available thermoforming processes, the level of crystallinity of the preformed sheet should not exceed about 10%.

The preheating of the substantially amorphous, cellular sheet prior to positioning over the thermoforming mold is necessary in order to achieve the very short molding times required for a viable commercial process. The sheet must be heated above its $T_g$ and below the point at which it sags excessively during positioning over the mold cavity. In the thermoforming process, a sheet temperature within the range of about 130° C. to about 210° C. and a mold temperature within the range of about 140° C. to about 220° C. will normally be utilized. It is often preferred to use a sheet temperature within the range of about 155° C. to about 185° C. and a mold temperature within the range of about 165° C. to about 195° C.

Multi-layered Articles

Multi-ply articles can be produced in a continuous process by co-extrusion of two or more distinct layers. This technique may be used, e.g., for aesthetic purposes, such as in making a two-tone, ovenable container. If desired, two polymeric layers can be co-extruded to "sandwich" a third layer. Optionally, a food-grade composition can be extruded over a non-food grade composition to prepare an ovenable container. Preferred thermoplastic compositions of the present invention have good sealability, e.g., permit packaging of refrigerated foods under pressure and the like. In some instances it may be desirable to extrude a more amorphous layer over a highly crystalline layer, e.g., as in hermetic sealing. Such additional layers may be selected from a wide variety of oriented and non-oriented films of homo-polymers, co-polymers, and mixtures thereof which can be straight-chained, branched, or mixtures thereof. Examples of such polymers include polyesters such as PET, PEN, PETG, PCT, PCTA, PBT, PTT, and mixtures thereof. Suitable methods that can be used for co-extrusion are described in U.S. Pat. Nos. 4,533,510, 4,929,482, and 5,318,811. A multi-ply article can have one or more solid layers and/or one or more cellular layers, which can be sequenced in any desired configuration.

Figure 2:
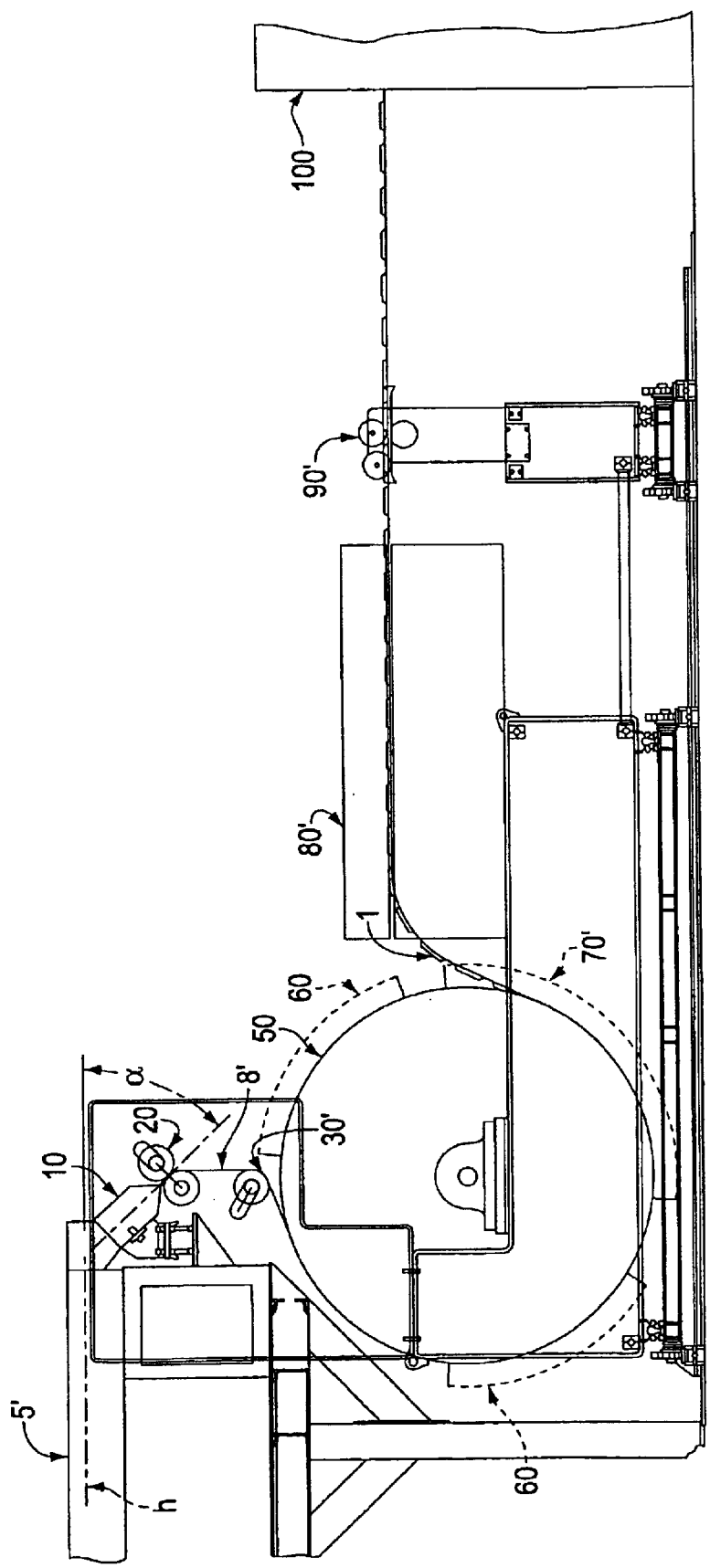
FIG. 2 is an illustration of a continuous melt phase thermoformer in accordance with an alternative embodiment of the invention.

With reference to FIG. 2, a co-extruder 5' having a single screw, a twin screw, or a combination of both, is used for co-extruding a multi-layered plastic sheet 8'. The layers of the sheet 8' can be solid layers, cellular layers, or any combination thereof. The sheet 8' can be fed between a pair of shaping and cooling rolls 20, followed by a roll 30' which can further cool, shape, and/or emboss the sheet 8', and which optionally laminates one or more additional thermoplastic sheets (not illustrated) to the co-extruded sheet 8'. The apparatus also can include one or more conditioning stations 60 disposed around the rotating wheel. By way of example, the conditioning stations 60 can apply coatings, in-mold labels, paperboard, foil inserts, and the like. An adjustable mechanical ejection station 70' ejects the articles 1 from the forming apparatus 50. The ejection station 70' is mounted such that its position along the circumference of the rotating wheel can be adjusted, e.g., to permit rearrangement of the apparatus, maintenance, and the like. Upon exiting the forming apparatus 50, the formed articles 1 optionally are fed into a unit 80' having one or more post-mold treatments such as perforating, heating, heat removal, or the like. As in the previous embodiments, the article should not be tensioned at any time to avoid distortion of the formed product.

According to another preferred embodiment of the invention, a multi-layered container comprises a first polymeric layer, and second intermediate or tie layer, and a third polymeric layer. The multi-layered container is particularly useful for packaging foodstuffs (e.g., fresh meat, fish, or vegetables, prepared or semi-prepared foods, and the like) using gas flushed sealing or modified atmosphere packaging (MAP) with highly elastic films. The polyalkylene terephthalate or naphthalate first layer provides stiffness and dimensional stability to the container, thereby avoiding deformation due to stresses, for example from the stretched lid stock. The first layer also provides the container with excellent gas barrier properties. The third polymeric layer provides markedly improved adhesion with conventional polyethylene-based lid stock. The container, as a whole, exhibits significantly improved gas barrier properties and shelf life for packaged foodstuffs.

The first layer, which usually forms the outside of the container, comprises an alkylene terephthalate or naphthalate polyester, such as polyethylene terephthalate (PET), as previously defined for the bulk polymer. The first layer may include, in whole or in part, virgin polymers, reprocessed or recycled polymers, post-consumer waste, and combinations thereof, any of which can be homo-polymers or co-polymers.

Polyesters having lower I.V. generally have lower molecular weights, shorter chain lengths, and exhibit faster crystallization kinetics, resulting in better heat setting properties (e.g., higher dimensional stability). In addition, lower-I.V. polymers generally are less expensive, and have lower extrusion melt temperatures, resulting in less degradation, faster stress relaxation time, reduced molding time and reduced production time. Given these properties, lower I.V. polyesters often can be drawn into deeper molds even without the use of a plug assist. A preferred polyester is polyethylene terephthalate (PET) having an I.V. of less than 0.95, 0.90, 0.85, or 0.80 (available from Shell Polyester). The thickness of the first layer should be suitably selected to provide the desired level of dimensional stability and adequate barrier properties to the container. Most often, the average thickness ranges from about 5 to 35 mils, more usually from about 10 to about 20 mils, and even more usually from about 12 to about 18 mils.

The intermediate or tie layer primarily functions as an adhesive and as a compatibilizer/emulsifier/surfactant (CES) for the first and third layers, which in a preferred embodiment are polar and non-polar, respectively. A preferred material for the intermediate or tie layer is a grafted or backbone-based co-polymer or ter-polymer comprising ethylene and a glycidyl acrylate, such as glycidyl methacrylate, and/or maleic anhydride. The co-polymer or ter-polymer optionally includes one or more other acrylate co-monomers such as methacrylate, ethylacrylate, propylacrylate, butylacrylate, ethylhexylacrylate, etc. Suitable exemplary amounts of glycidyl acrylate, maleic anhydride, or mixture thereof, range from about 0.05 wt % to about 12 wt %, typically from about 0.1 wt % to about 10 wt %, and more typically from about 0.8 wt % to about 9 wt %, based on the total weight of the co-polymer or ter-polymer. A grafted co-polymer or ter-polymer typically will have less glycidyl acrylate or maleic anhydride (e.g., from about 0.2 wt % to about 1.5 wt %), whereas a backbone-based co-polymer or ter-polymer can have higher amounts of glycidyl acrylate and/or maleic anhydride, e.g., as indicated above. Suitable exemplary amounts of acrylate range from 0 to about 40 wt %, preferably from about 10 wt % to about 30 wt %, and even more preferably from about 20 wt % to about 35 wt %, based on the total weight of the co-polymer or ter-polymer. The melt flow index of the co-polymer or ter-polymer preferably is less than about 20, more preferably is less than about 10, and even more preferably is less than about 6 g/10 min.

In one preferred embodiment, the intermediate or tie layer comprises a ter-polymer of ethylene with about 8 wt % glycidyl methacrylate and about 25 wt % methacrylate or butylacrylate, based on the total weight of the ter-polymer. In another preferred embodiment, the intermediate or tie layer comprises a co-polymer of ethylene with about 6 wt % glycidyl methacrylate, based on the total weight of the co-polymer. In another preferred embodiment, the intermediate or tie layer comprises a ter-polymer of ethylene with about 2 wt % glycidyl methacrylate and from about 17 to 25 wt % methacrylate, based on the total weight of the ter-polymer. In yet another preferred embodiment, the intermediate or tie layer comprises a ter-polymer of ethylene with about 3 wt % maleic anhydride and about 17 wt % butylacrylate, based on the total weight of the ter-polymer. Where the first layer includes both reprocessed and virgin polyesters, it may be advantageous to use a blend of the CES polymer families (e.g., glycidyl methacrylate- and maleic anhydride-based) to alter the mode of failure so as to improve adhesion. Under failure conditions, the tie layer generally will delaminate from the polyethylene layer when using the glycidyl methacrylate-based CES, and from the polyester layer when using the maleic anhydride-based CES.

The second layer optionally comprises a blend of the CES co-polymer or ter-polymer, as described above, and a polar co-polymer of ethylene and a $C_1$–$C_{12}$ acrylate, such as methacrylate, ethylacrylate, propylacrylate, butylacrylate, ethylhexylacrylate, or a mixture thereof. The polar co-polymer can be added, for example, to adjust rheology and/or to improve adhesion, thermal stability, compatibility, and the like. The amount of polar co-polymer used will depend on such factors as the co-monomer concentration in the CES. It has been found that improved adhesion and compatibility actually can result when a polar co-polymer is blended with a high co-monomer CES (e.g., 12 wt % of glycidyl methacrylate) at a weight ratio up to about 4:1 (polar co-polymer to CES).

The second layer typically has an average thickness of at least about 0.1 mils. There is no particular upper limit on the thickness; the practical limiting factor is cost. Most often, the average thickness ranges from about 0.1 to about 2 mils, and more usually from about 0.2 to about 1.5 mils.

The third layer comprises non-polar polyethylene. A preferred material for the third layer is high density polyethylene (HDPE) sold under the trade name Chevron 9608, which has a melt flow index of 8 and a density of 0.962. Alternatively, the third layer can comprise low density polyethylene (LDPE), linear low density polyethylene (LLDPE), or any combination of HDPE, LDPE, and LLDPE. Because LDPE generally exhibits poorer barrier properties than HDPE, it is preferred that no more than about 50 wt % LDPE is used, so as to avoid the need for an excessively thick layer. An example of a highly branched LDPE that can be used is Chevron grade 4517, which has a density of 0.923 and a melt flow index of 5. Highly branched polymers typically exhibit improved seal strength over time, but suffer from poorer functional barrier properties. One preferred linear low density polyethylene is Linear Low Density Chevron 7325, which has a density of 0.925 and a melt flow index of 3.5. A blend of HDPE and LLDPE materials often exhibits improved compatibility with reprocessed polyesters and improved heat-setting properties. An example of a blend exhibiting improved hot tack sealing has a major portion of HDPE and from about 10–20wt % LLDPE.

Any or all of the polyethylene materials in the third layer can include, in whole or in part, metallocene-based polyethylene. Metallocene-based polyethylene materials generally have lower melting points and are more amorphous, which improves heat-sealing properties.

The third layer typically will form the inside of a container and may be selected to provide aesthetics, color, gas barrier properties, and the like. The third layer preferably is selected to improve sealing (adhesion) properties with lidding materials to be later applied onto the container. Commonly used lid stocks include Cryovac 1050, Freshwrap and similar types sold by Cryovac and Packaging Partners. The average thickness of the third layer in the final article most often is greater than about 1 mil, typically ranges from about 1 to about 5 mils, more typically from about 2 to about 4 mils, and even more typically from about 3 to about 4 mils.

Foodstuffs can be packaged in the container using gas flushed sealing or modified atmosphere packaging (MAP). In a typical operation, oxygen ($O_2$), nitrogen ($N_2$), and optionally carbon dioxide ($CO_2$) are controllably flushed into a container containing a foodstuff as the highly elastic lid stock is stretched and sealed to the flange portion of the container. One of the reasons for using highly elastic materials is to avoid sagging of the lid stock due to pressure changes inside the container over time, e.g., as the foodstuff absorbs carbon dioxide.

An example of a three-layered thermoplastic container comprises a first layer comprising a polyethylene terephthalate co-polymer; a second layer comprising a grafted ter-polymer of ethylene and 30 wt % methacrylate and 0.8–1.5 wt % glycidyl methacrylate or maleic anhydride, based on the total weight of the ter-polymer;and a third layer comprising a blend of HDPE and 10–20% LLDPE or Bynel E361 or 3060.

In an alternative embodiment of the present invention, the intermediate or tie layer comprises any suitable adhesive useful in adhering adjacent layers of co-extruded films. In this embodiment, a minor amount of the CES is physically blended with the polyester together with recycled or reprocessed polymers in the first layer, typically in an amount of from about 1 to about 5 wt %. Examples of materials that can be used for the intermediate or tie layer in this embodiment include chemically modified ethylene polymers, e.g., co-polymers of ethylene with esters of ethylenically unsaturated carboxylic acids, such as alkyl acrylates or methacrylates, graft co-polymers of maleic acid or anhydride onto ethylene vinyl acetate copolymers, graft co-polymers of fused ring carboxylic anhydrides onto polyethylene, resin mixtures of these, and mixtures with polyethylene or co-polymers of ethylene and alpha olefin.

Such materials include adhesives sold under the tradename Bynel (duPont) or Admer (Mitsui).

The area stretch ratio of the multi-layered container most often ranges from about 1.25:1 to about 3:1, more usually from about 1.5:1 to about 3:1. In one preferred embodiment, the area stretch ratio is about 2:1.

The thermoplastic materials, and in particular the alkylene terephthalate or naphthalate polymer, can subjected to thermal treatments in accordance with the intended use of the container. Preferably, the materials are heat set to provide dimensional stability, impact resistance, temperature resistance, and resistance to microwave radiation. A level of crystallinity above 15% is preferable for adequate dimensional stability during demolding operations. A level above about 20% is preferable to yield parts with excellent dimensional stability and impact resistance.

In an alternative multi-layered container embodiment, the thermoplastic material is subjected to a thermal treatment that is specifically designed to cause the container to become visibly distorted when the container contains foodstuffs and is exposed to microwave radiation. This can be done, for example, by molding the polyester at a lower temperature and/or by maintaining the polyester at the molding temperature for a shorter time so as to achieve no more than minimal heat setting. The distortion, for example, can alert consumers that the container is not intended for use in a microwave oven. Notwithstanding the distortion, the container remains microwave-safe, i.e., does not contaminate the food upon exposure to microwave radiation.

Alternatively, the containers can be heat set, as described, so as to provide containers specifically designed for cooking applications such as thawing frozen foods in a microwave oven, e.g., without distortion. The thermoplastic materials can be subjected to thermal treatments to render the container heat resistant and suitable for various other cooking applications, as desired.

Given the dissimilarities in the properties of the three layers (e.g., met ting point), three extruders preferably are used for processing the first, second, and third layers, respectively. It is preferred that the co-extrudate not be stretched or oriented in either direction. In a typical continuous process, the co-extrudate, after leaving the extrusion die and optionally being fed over cooling or shaping rollers, is contacted with a rotating wheel having a plurality of mold members as previously discussed. The time that the co-extrudate remains in contact with, the mold surface at the molding temperature can vary over a wide range and depends on a number of factors, such as the molding temperature, the dimensions of the mold, the number of molds, and the like. Preferably, the co-extrudate remains in the mold for a time sufficient to heat-set the article. The time at the molding temperature most often ranges from about 10–30 seconds, more usually from about 10–20 seconds.

A significant advantage of a continuous process over a discontinuous process is that the individual layers can be extruded and molded at different temperatures in accordance with their individual thermoforming properties, such as softening and melting points. The first layer (polyester) typically is extruded it a temperature of from about 450 to 530° F. (about 232 to 276° C.). The intermediate or tie layer most often is extruded at a higher temperature to improve its adhesion properties, typically from about 480 to 550° F. (about 249 to 288° C.). The third, polyethylene layer typically is extruded at a temperature of from about 425 to about 550° F. (about 218 to 288° C.).

By extruding each of the layers at their individual most suitable thermoforming temperatures, surface contact between the layers is dramatically improved and the likelihood of delamination is reduced or avoided. In addition, the vacuum in the mold often is sufficient to obtain adequate contact between the layers for adhesion, without the need for a pressure box. It is desirable to avoid the use of a pressure box not only because of increased process time and expense, but also because of the problem of unwanted adhesion between the pressure box and the upper (e.g., polyethylene) layer.

Preferably, the layers are co-extruded with the (thicker) first layer on top, and a reversing roll is used to invert the co-extrudate prior to being contacted with the molding surface. When female molds are used, the first layer typically contacts the mold surface.

EXAMPLE 1

This example illustrates the improved retained I.V. and improved toughness characteristics of compositions of the present invention.

Three compositions (A, B, C) were used to prepare heat-set trays in accordance with the continuous process described above. Each of the three compositions included a bulk polymer that included 70 wt % of Shell 0.85 I.V. homopolymer, a toughener additive, and a glycidyl methacrylate-based CES. The remaining 30 wt % of the bulk polymers of the compositions was as follows. For composition "A": Dupont 0.85+0.82 I.V. homopolymer, for composition "B": KOSA 0.60–0.62 I.V. homopolymer; and for composition "C": Reliance 0.80 I.V. co-polymer. Each of these polymers is commercially available. Table I summaries the final intrinsic viscosity of the articles, both uncorrected and corrected for 15% additives.

TABLE I

Final Intrinsic Viscosity

|  | Composition A | Composition B | Composition C |
| --- | --- | --- | --- |
| I.V. uncorrected | 0.661 | 0.605 | 0.629 |
| I.V. corrected for 15% additives | 0.765 | 0.706 | 0.736 |

As can be seen from Table I, the compositions of the present invention exhibit good retained I.V. The "I.V. corrected for 15% additives" is illustrative of the compositions' good retained I.V., e.g., by comparison to the initial I.V. of the bulk polymers, which does not include additives. The initial viscosity of the compositions, as defined herein, would be less than the initial I.V. of the respective bulk polymers because of the presence of the additives.

Containers made from compositions A, B, and C were subjected to impact testing using standard Dynatup Impact equipment. Table II illustrates the toughness results at 70° F. (21° C.), 32° F. (0° C.), and −20° F. (−29° C.).

TABLE II

Dynatup Impact Toughness

| Test | Sample A | Sample B | Sample C |
| --- | --- | --- | --- |
| Dynatup Impact lbs. @ 70° F. (21° C.) | 137 s.d. 5.0 | 167 s.d. 6.1 | 134 s.d. 5.0 |
| Dynatup Impact lbs. @ 32° F. (0° C.) | 158 s.d. 7.6 | 200 s.d. 9.2 | 154 s.d. 4.5 |
| Dynatup Impact lbs. @ −20° F. (−29° C.) | 173 s.d. 9.7 | 211 s.d. 35.2 | 173 s.d. 19.6 |
| Thickness (mils) | 18 | 25 | 20 |

As can been seen from Table II, surprisingly and inexplicably, the containers of the present invention were found to actually exhibit increased toughness at lower temperatures.

EXAMPLE II

This example also illustrates the improved toughness properties of the compositions of the present invention.

Figure 7:
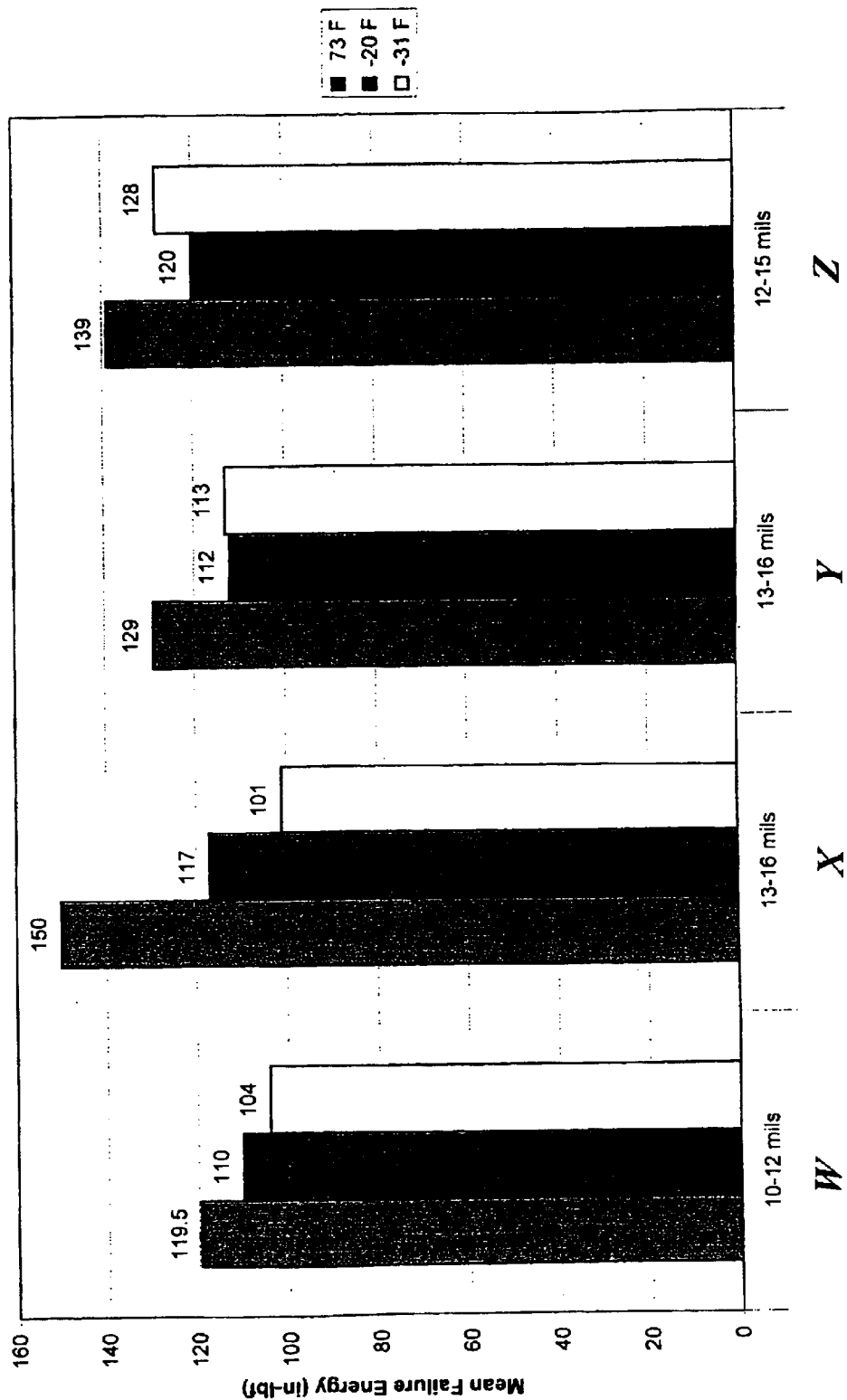
FIG. 7 is a table showing the improved toughness properties of certain preferred thermoplastic compositions of the present invention.

Trays were prepared using a 0.85 I.V. Shell 8506 homopolymer, a toughener additive, and a glycidyl methacrylate-based CES. One tray ("W") was prepared using the continuous process described above, and three trays ("X", "Y", and "Z") were prepared using a discontinuous process, similar to that described in Gartland U.S. Pat. No. 4,469,270. The trays were tested for toughness using a standard Gardner Impact test. FIG. 7 illustrates the mean failure energy at 73° F. (23° C.), −20° F. (−29° C.), and −31° F. (−35° C.). For each container, 20 samples were tested at 73° F. (23° C.) and at −20° F. (−29° C.), and 40 samples were tested at −31° F. (−35° C.).

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A thermoforming process for preparing a thermally crystalline polyester food tray exhibiting dimensional stability at elevated temperatures, the process comprising:

(i) preparing a polymeric composition comprising an alkylene terephthalate or naphthalate bulk polymer; from about 4 to about 15 wt % based on the total weight of the polymeric composition of an additive comprising a substantially amorphous co-polymer of ethylene and an acrylate; and from about 0.1 to about 4 wt % based on the total weight of the polymeric composition of a compatibilizer/emulsifier/surfactant (CES) comprising a grafted or backbone co-polymer or ter-polymer of ethylene and a glycidyl acrylate or maleic anhydride, and optionally an acrylate selected from the group consisting of methacrylate, ethylacrylate, propylacrylate, butylacrylate, ethylhexylacrylate, and mixtures thereof;

(ii) extruding said polymeric composition through an extrusion die to form a thermoformable extrudate in a substantially non-oriented state;

(iii) contacting the extrudate with a shaping surface to thermoform the extrudate into at least one food tray; and (iv) separating and recovering the at least one food tray.

2. The process of claim 1 wherein said bulk polymer is selected from the group consisting of PET, PEN, PETG, PCT, PCTA, PBT, PTT, and mixtures thereof.

3. The process of claim 1 wherein said additive is selected from the group consisting of ethylene/methylacrylate co-polymer, ethylene/butylacrylate co-polymer, ethylene/ethylacrylate co-polymer, ethylene/ethylhexylacrylate co-polymer, and mixtures thereof, and optionally contains a core-shell toughener.

4. The process of claim 1 wherein said CES is selected from the group consisting of ethylene/glycidyl methylacrylate co-polymer, ethylene/maleic anhydride co-polymer, ethylene/glycidyl methacrylate/methacrylate ter-polymer, ethylene/glycidyl methacrylate/ethylacrylate ter-polymer, ethylene/glycidyl methacrylate/butylacrylate ter-polymer, ethylene/glycidyl methacrylate/ethylhexylacrylate ter-polymer, ethylene/maleic anhydride/methacrylate ter-polymer, ethylene/maleic anhydride/ethylacrylate ter,-polymer, ethylene/maleic anhydride/ butylacrylate ter-polymer, ethylene/maleic anhydride/ethylhexylacrylate ter-polymer, and mixtures thereof.

5. The process of claim 1 wherein said food tray at a thickness of about 15 to 25 mils has a Dynatup Impact toughness rating at 70° F. (21° C.) of at least 125 and Dynatup Impact toughness rating at −20° F. (−29° C.) of at least 120.

6. The process of claim 5 wherein said Dynatup rating at −20° F. (−29° C.) is at least 140.

7. The process of claim 6 wherein said Dynatup rating at −20° F. (−29° C.) is at least 150.

8. The process of claim 1 wherein said bulk polymer is heat set and, following heat setting, has a final intrinsic viscosity that is at least about 70% of the initial intrinsic viscosity of said bulk polymer.

9. The process of claim 8 wherein said final intrinsic viscosity is at least about 75% of said initial intrinsic viscosity.

10. The process of claim 9 wherein said final intrinsic viscosity is at least about 80% of said initial intrinsic viscosity.

11. The process of claim 10 wherein said final intrinsic viscosity is at least about 85% of said initial intrinsic viscosity.

12. The process of claim 1 further comprising a step of combining the trimmed and removed portions of the extrudate with virgin materials of step (i).

13. A thermoforming process for preparing a dimensionally stable, thermally crystalline polyester article, the process comprising:

(i) preparing a polymeric composition comprising polyethylene terephthalate having an intrinsic viscosity of less than 0.95; from about 4 to about 40 wt % based on the total weight of the polymeric composition of an additive comprising a substantially amorphous co-polymer of ethylene and an acrylate; and from about 0.1 to about 8 wt % based on the total weight of the polymeric composition of a compatibilizer/emulsifier/surfactant (CES) comprising a grafted or backbone co-polymer or ter-polymer of ethylene and a glycidyl acrylate or maleic anhydride, and optionally an acrylate selected from the group consisting of methacrylate, ethylacrylate, propylacrylate, butylacrylate, ethylhexylacrylate, and mixtures thereof;

(ii) extruding said polymeric composition through an extrusion die to, form a thermoformable extrudate in a substantially non-oriented state;

(iii) contacting the extrudate with a shaping surface at a temperature and for a time sufficient to thermoform the extrudate into a dimensionally stable article; and (iv) separating and recovering the article.

14. The process of claim 13 wherein said intrinsic viscosity is less than about 0.9.

15. The process of claim 14 wherein said intrinsic viscosity is less than about 0.85.

16. The process of claim 15 wherein said initial intrinsic viscosity is less than about 0.8.

17. The process of claim 13 wherein said additive is selected from the group consisting of ethylene/methylacrylate co-polymer, ethylene/butylacrylate co-polymer, ethylene/ethylacrylate co-polymer, ethylene/ethylhexylacrylate co-polymer, and mixtures thereof, and optionally contains a core-shell toughener.

18. The process of claim 13 wherein said CES is selected from the group consisting of ethylene/glycidyl methylacrylate co-polymer, ethylene/maleic anhydride co-polymer, ethylene/glycidyl methacrylate/methacrylate ter-polymer, ethylene/glycidyl methylacrylate/ethylacrylate ter-polymer, ethylene/glycidyl methacrylate/butylacrylate ter-polymer, ethylene/glycidyl methacrylate/ethylhexylacrylate ter-polymer, ethylene/maleic anhydride/methacrylate ter-polymer, ethylene/maleic anhydride/ethylacrylate ter-polymer, ethylene/maleic anhydride/butylacrylate ter-polymer, ethylene/maleic anhydride/ ethylhexylacrylate ter-polymer, and mixtures thereof.

19. The process of claim 13 further comprising a step of combining the trimmed and removed portions of the extrudate with virgin materials of step (i).

* * * * *